United States Patent [19]

Bota

[11] Patent Number: 5,052,531
[45] Date of Patent: Oct. 1, 1991

[54] NEUTRAL CONTROL DEVICE OF AUTOMATIC TRANSMISSION

[75] Inventor: Keiji Bota, Hiroshima, Japan

[73] Assignee: Mazda Motor Corporation, Hiroshima, Japan

[21] Appl. No.: 567,775

[22] Filed: Aug. 15, 1990

[30] Foreign Application Priority Data

Aug. 23, 1989 [JP] Japan .................................. 1-217013

[51] Int. Cl.⁵ ............................................. F16D 55/24
[52] U.S. Cl. .................... 192/4 A; 74/866; 74/861
[58] Field of Search ............... 74/861, 866; 192/4 A, 192/0.072

[56] References Cited

U.S. PATENT DOCUMENTS

| 3,565,220 | 2/1971 | Lammers | 192/4 A |
|---|---|---|---|
| 3,746,135 | 7/1973 | Ishikawa | 192/4 A |
| 4,591,016 | 5/1986 | Matthews | 192/4 A X |
| 4,610,338 | 9/1986 | Kubota et al. | 192/4 A X |
| 4,645,051 | 2/1987 | Maezono et al. | 192/4 A X |
| 4,667,784 | 5/1987 | Cronin | 192/4 A |
| 4,825,989 | 5/1989 | Frigger | 192/4 A X |
| 4,850,251 | 7/1989 | Kuwayama et al. | 74/866 |
| 4,891,758 | 1/1990 | Simonyi et al. | 74/866 X |

FOREIGN PATENT DOCUMENTS

| 59-34051 | 2/1984 | Japan | . |
|---|---|---|---|
| 0053254 | 3/1985 | Japan | 74/861 |
| 3528536 | 2/1986 | Japan | 192/4 A |
| 0175982 | 4/1986 | Japan | 192/4 A |
| 0085736 | 4/1987 | Japan | 192/4 A |

Primary Examiner—Allan D. Herrmann
Assistant Examiner—Daniel Wittels
Attorney, Agent, or Firm—Sixbey, Friedman, Leedom & Ferguson

[57] ABSTRACT

A device provides transmission control whereby when a vehicle starts from standing state, even if a driver releases a brake pedal, action of the brake is maintained compulsorily until the starting gear position is formed by connection of frictional elements in the automatic transmission. Therefore, this device prevents effectively a vehicle from slipping down, upon starting on an upwardly sloped road, without more action of the brake than is necessary and with good startability.

4 Claims, 5 Drawing Sheets

NEUTRAL CONTROL DEVICE OF AUTOMATIC TRANSMISSION

BACKGROUND OF THE INVENTION

1. Field of the Invention

This invention relates to a neutral control device of an automatic transmission, more particularly, a device for preventing the slipping down of a vehicle stopped on an upward slope.

2. Description of the Prior Art

Generally, in the case where an automatic transmission is left as it is in a running range when the vehicle is stopped, engine vibration is transmitted to a vehicle through a motive power transmitting channel or engine load acts continually, with the result of wasteful fuel consumption.

In the light of the above problem, Japanese Patent Application Laid Open Gazette No. 59-34051, for example, discloses a device wherein when the vehicle is stopped, the transmission is controlled to be placed in "neutral" while a brake pedal is stepped on so as to prevent engine vibration from being transmitted to the vehicle, and also to save on fuel consumption because of the no-load state.

According to the above device, a transmission is controlled to be placed in "neutral" only while a brake pedal is stepped on and therefore movement of a vehicle will hardly take place so long as the brake is working, but when a driver releases the brake at starting, especially on a sloped road, the transmission is shifted from the "neutral range" to the "running range" by this releasing operation and formation of the starting gear position begins. However, until such gear position is formed, a vehicle will gradually go down the upward slope by its own weight.

BRIEF DESCRIPTION OF TUE INVENTION

In view of the above problem, the present invention has for its object to have a vehicle start smoothly, free from slippage in a backward direction, even upon starting on an upward slope road In order to attain the above object, the present invention is designed so that even if a driver releases a brake pedal, action of the brake is maintained compulsorily until a gear position is achieved to a certain extent. More particularly, the device according to the present invention comprises a speed shifting control means to control a transmission to shift to "neutral" while the brake pedal is stepped on when the vehicle is stopped, an r.p.m. detecting means to detect r.p.m. on the input side of the transmissio, a pedal operation detecting means to detect operation of the brake pedal and a brake control means which maintains ON action of brake actuator until the change of r.p.m. on the input side of the transmission (caused by the brake pedal releasing operation and consequent shifting of the transmission to the starting gear position) drops below a set value corresponding approximately to the r.p.m. existing when the friction elements forming the starting gear position are connected.

Under the above construction of the present invention, so long as a driver is stepping on the brake pedal in a stopped state the transmission is controlled to be placed in "neutral" compulsorily and therefore engine vibration is not transmitted to a vehicle and engine load does not act, with the result that fuel consumption is reduced.

When a driver releases the brake pedal at starting, the transmission is shifted to the "running range" and frictional elements composing the starting gear position begin to connect. When connecting of frictional elements progresses, r.p.m. on the input side of the transmission lowers and connecting of frictional elements approaches completion. Namely, when a vehicle is ready to start smoothly due to transmission of engine motive power, r.p.m. on the input side of the transmission becomes below the set value and at this point of time, the brake actuator goes OFF and the vehicle will start smoothly, free from slipping down, even on an upward slope road.

The above object and novel features of the present invention will be more apparent by reading the following detailed description, with reference to the attached drawings.

BRIEF DESCRIPTION OF THE DRAWINGS

The attached drawings show a preferred embodiment of the present invention, in which.

DETAILED DESCRIPTION OF THE INVENTION

A description is made below of a preferred embodiment of the present invention.

Figure 1:
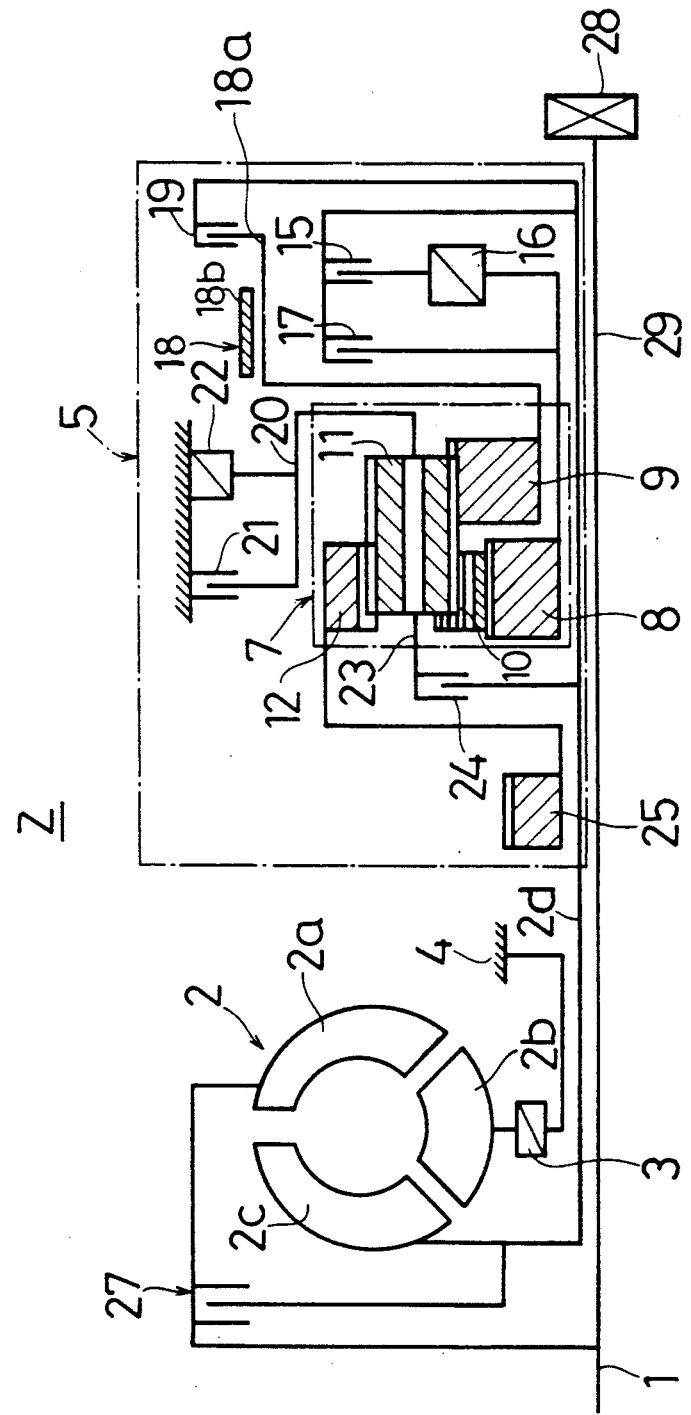
FIG. 1 is a skeleton drawing of an automatic transmission.
Figure 2:
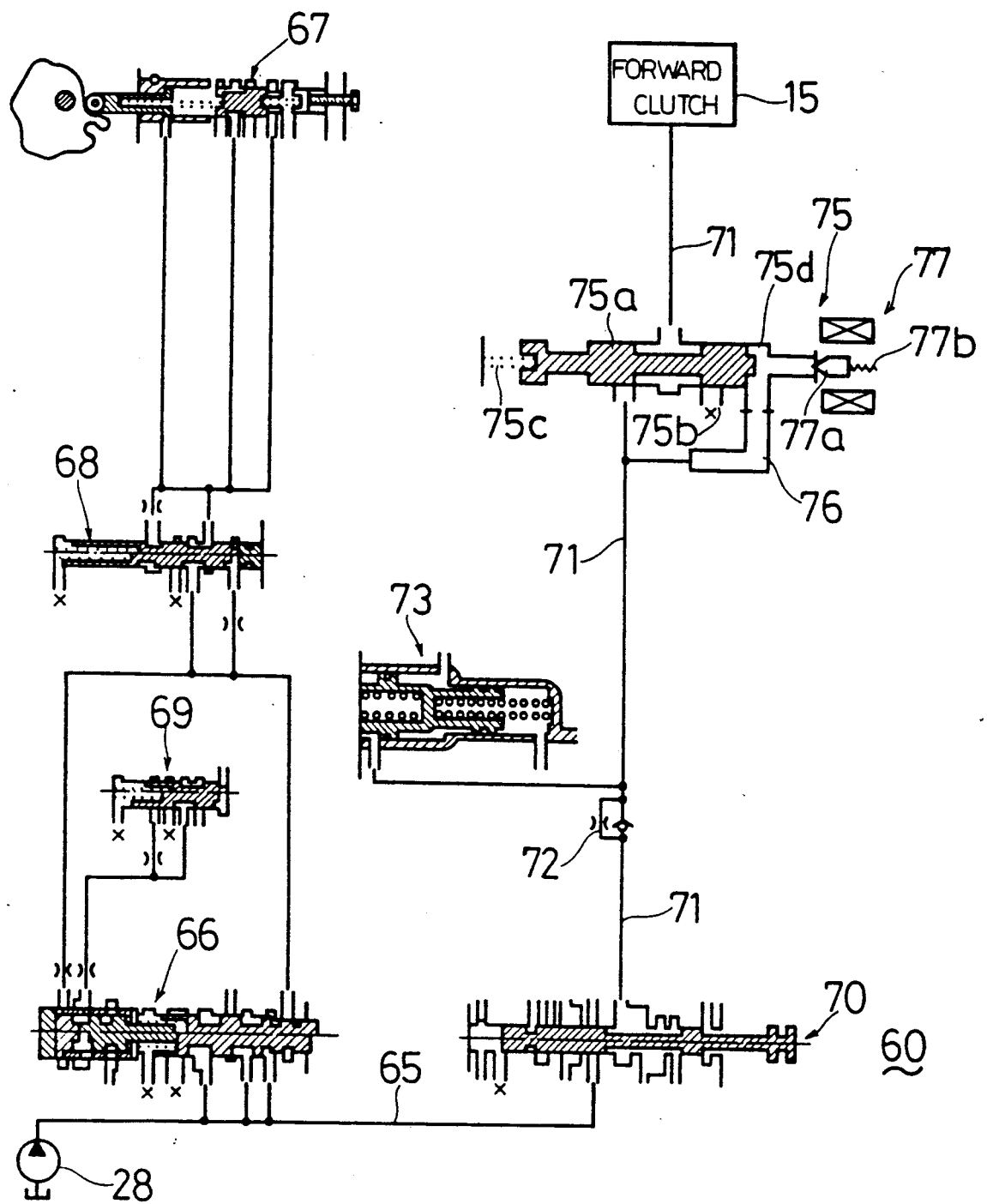
FIG. 2 shows an oil pressure circuit for working a forward clutch.

FIG. 1 shows an automatic transmission Z of four forward stages and one reverse stage. Reference numeral 1 designates an engine output shaft. Reference numeral 2 designates a torque converter equipped with a pump 2a connected to the engine output shaft 1, a stator 2b and turbine 2c. The stator 2b is provided fixably at a case 4 through the medium of a one-way clutch which prevents the stator 2b from rotating in the direction opposite to the turbine 2c. Reference numeral 5 designates a speed change gear connected to converter output shaft 2d which is connected to the turbine 2c of the torque converter 2.

The speed change gear 5 has within a Lavinyo type planetary gearing 7. This planetary gearing 7 comprises a sun gear 8 of small diameter, a sun gear 9 of large diameter, a short pinion gear 10 which meshes with the sun gear 8, a long pinion gear 11 which meshes with the sun gear 9 and the short pinion gear 10 and a ring gear 12 which meshes with the long pinion gear 11. The sun gear 8 of small diameter is connected to the output shaft 2d of the torque converter 2 through the medium of a forward clutch 15 provided rearwardly of the sun gear 8 and a first one-way clutch 16 which is connected vertically to the clutch 15 and which checks the reverse drive of the converter output shaft 2d. A coast clutch 17 is connected in parallel to the channel which connects vertically the forward clutch 15 and the one-way clutch 16. The sun gear 9 of large diameter is connected to the output shaft 2d of the torque coverter 2 through the medium of a 2-4 brake 18 provided rearwardly of the sun gear 9 and a reverse clutch 19 arranged rearwardly of the 2-4 brake 18. Connected to the long pinion gear in a row through the medium of its rear side carrier 20 are low & reverse brake 21 which fixes the long pinion gear 11, and a second one-way clutch 22 which allows the long pinion gear 11 to rotate in the same direction as the engine output shaft 1. A front side carrier 23 of the long pinion gear 11 is connected to the output shaft 2d of the torque converter 2 through the medium of a 3-4 clutch 24. The ring gear 12 is connected to an output gear 25 arranged in front of the ring gear 12. In FIG. 1, reference numeral 27 designates a lock up clutch which connects the engine output shaft 1 directly with the converter output shaft 2d. Reference numeral 28 designates an oil pump which is driven by the engine output shaft 1 through the medium of an intermediate shaft 29.

This line 71 is led to the forward clutch 15 through the medium of a one-way orifice 72. In the (D), (2) and (1) ranges, the forward clutch 15 is kept clutched.

Provided at the first output line 71 is an N-D accumulator which buffers clutching of the forward clutch 15 and a control valve 75 which puts in or releases the forward clutch 15.

The control valve 75 has a spool 75a and a drain port 75b. While a spring 75c is provided in compression leftward in the figure, a pilot room 75d is formed rightward in the figure. The line 71 on the upstream side of the control valve 75 is connected to the pilot room 75d via a passage 76. The control valve 75 also has a solenoid 77 carrying a valve body 77a which opens and closes the pilot room 75d. The solenoid 77, in an OFF state, generates pilot pressure by biasing the valve body

|  |  | REVERSE CLUTCH | COAST CLUTCH | FOR-WARD CLUTCH | 3-4 CLUTCH | LOW & REVERSE BRAKE | 2-4 BRAKE | No. 1 ONE-WAY CLUTCH | No. 2 ONE-WAY CLUTCH |
|---|---|---|---|---|---|---|---|---|---|
|  | P |  |  |  |  |  |  |  |  |
|  | R | O |  |  |  | O |  |  |  |
|  | N |  |  |  |  |  |  |  |  |
| (D) RANGE | 1 SPEED SHIFT STAGE |  |  | O |  |  |  | (O) | (O) |
|  | 2 SPEED SHIFT STAGE |  |  | O |  |  | O | (O) |  |
|  | 3 SPEED SHIFT STAGE |  | O | O | O |  |  | (O) |  |
|  | O D |  |  | O | O |  | O |  |  |
| (2) RANGE | 1 SPEED SHIFT STAGE |  |  | O |  |  |  | (O) |  |
|  | 2 SPEED SHIFT STAGE |  | O | O |  |  | O | (O) |  |
|  | 3 SPEED SHIFT STAGE |  | O | O | O |  |  | (O) |  |
| (1) RANGE | 1 SPEED SHIFT STAGE |  | O | O |  | O |  | (O) |  |
|  | 2 SPEED SHIFT STAGE |  | O | O |  |  | O | (O) |  |

Remark:
(O) shows that a clutch is working but is not contributing to power transmission.

As can be seen from the above table, at the first gear position if in the (D) range (running range) and at the N (neutral) position, only the action of the forward clutch 15 is different and therefore in this embodiment, when a vehicle stops in the (D) range, the forward clutch 15 is released to shift to the N position.

An explanation is made below of an oil pressure circuit which supplies and discharges working oil in relation to frictional elements of the forward clutch 15.

Provided in an oil pressure circuit 60 is a pressure regulator valve 66 which regulates pressure of working oil discharged from the oil pump 28 shown in FIG. 1 to a main line 65 to the specified line pressure. Provided close to the pressure regulator valve 66 is a throttle valve 67 which generates throttle pressure according to the throttle valve opening of the engine. A throttle modulator 68 which modulates the throttle pressure and a backup valve 69.

Also provided in the oil pressure circuit 60 is a manual valve 70 which sends out selectively line pressure generated at the pressure regulator valve 66 to each oil pressure line according to the selected range.

A first output line 71 connected to the first output port in the manual valve 70 is a line which communicates with the main line 65 in each forward range of (D), (2) and (1).

77a in the left direction in the figure by means of the spring 77b to close the pilot room 75d. By biasing the spool 75a of the control valve 75 in the left direction in the figure by that pilot pressure, the drain port 75b is closed and clutching pressure of the line 71 is supplied to the forward clutch 15 for clutching. On the other hand, at the time of an ON state, the valve body 77a is moved in the right direction in the figure against biasing force of the spring 77b to open the pilot room 75d, whereby the spool 75a of the control valve 75 is moved in the right direction in the figure to close the line 71 on the upstream side but to make the line 71 on the downstream side communicate with the drain port 75b so as to release clutching pressure and release clutching action of the forward clutch 15.

Figure 3:
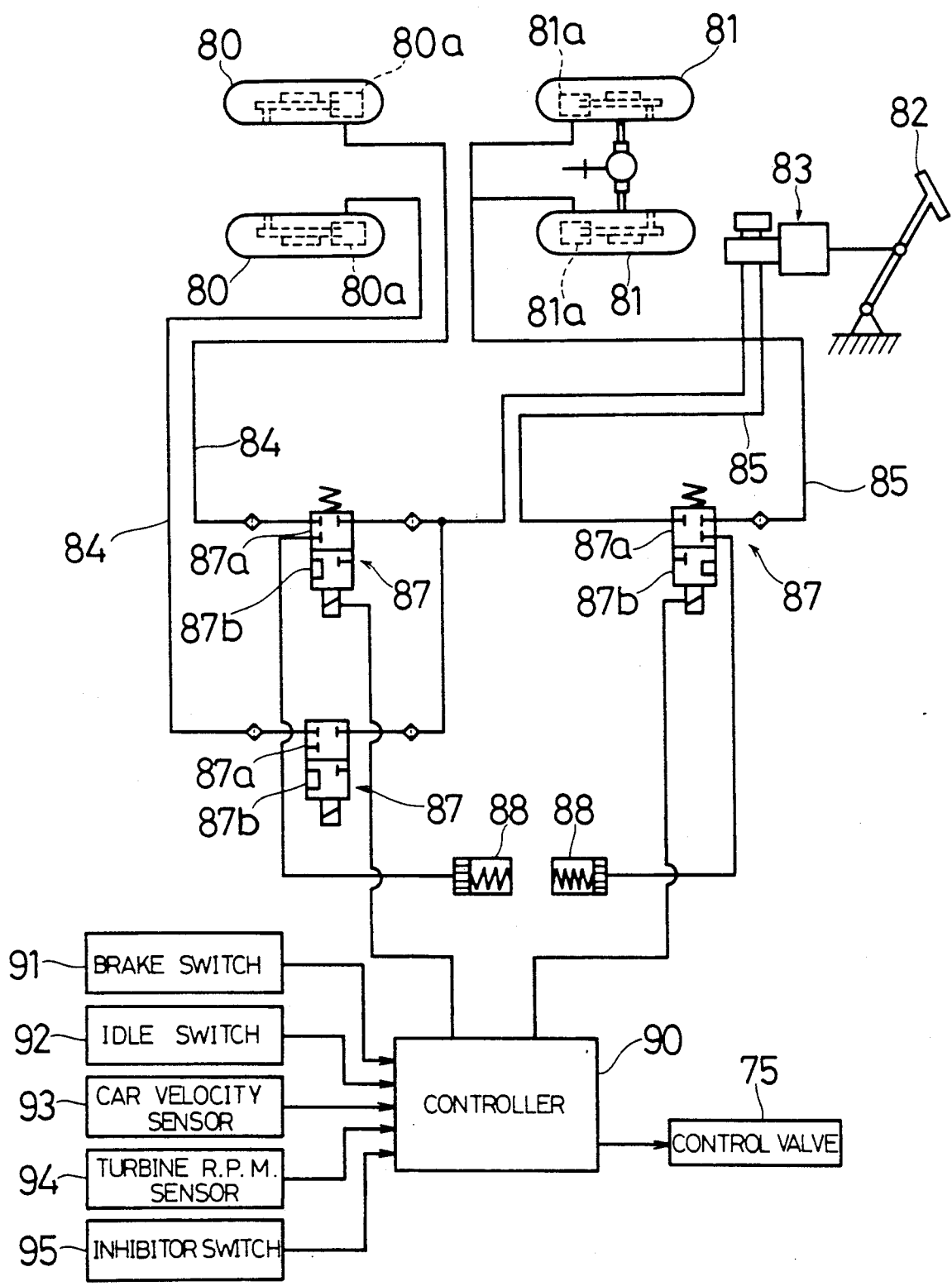
FIG. 3 shows a brake oil pressure circuit.

An explanation is made below of a brake oil pressure maintaining circuit for wheels, with reference to FIG. 3 (a circuit which produces ordinary brake oil pressure is omitted). In FIG. 3, reference numeral 80 designates a front wheel. Reference numeral 81 designates a rear wheel. Reference numeral 82 designates a brake pedal. Reference numeral 83 designates a master cylinder which generates brake oil pressure. Oil pressure generated at the master cylinder 83 acts independently on left and right front wheels 80 via two pipings 84 on the front wheel side and also acts on each wheel cylinder 81a of left and right rear wheels 81 via a piping 85 on the rear wheel side. The two pipings 84 on the front wheel side and the piping 85 on the rear wheel side are equipped with magnet valves 87. Each magnet valve 87 has two positions, namely, a holding position 87a which intercepts the corresponding piping 84 or piping 85 and a pressure reducing position 87b which makes the pipings 84, 85 on the downstream side (wheel side) communicate with a reservoir 88 and closes the pipings 84, 85 on the upstream side. When the magnet valve 87 is at the holding position 87a, it holds brake oil pressure which acts on wheel cylinders 80a, 81a but when it is at the pressure reducing position 87b, it returns brake oil which acts on wheel cylinders 80a, 81a to the reservoir 88 to reduce brake oil pressure.

In FIG. 3, reference numeral 90 designates a controller having therein a CPU, etc. By this controller 90, the above-mentioned three magnet valves 87 and the control valve 75 are controlled. Signals are inputted to the controller 90 from each of a brake switch 91 (acting as a pedal detecting means which detects operation of the brake pedal 82 and is switched ON when a stepping on operation is detected and switched OFF at the time of a releasing operation), an idle switch 92 which detects releasing operation of an accelerator pedal (not shown in the drawing). a vehicle velocity sensor 93 which detects vehicle velocity, a turbine r.p.m. sensor 94 (as an r.p.m. detecting means which detects turbine r.p.m. of the torque converter 2 as r.p.m. on the input side of the speed change gear 5 of the automatic transmission Z) and an inhibitor switch 95 which detects the range position of the automatic transmission Z.

An explanation is made below of the gear change control and the brake control by the controller 90 at the time that the vehicle is stopped and at the time of starting, on the basis of the control flow chart of FIG. 4.

Upon starting, at step $S_1$ it is judged whether or not the automatic transmission is in the (D) range on the basis of the output of the inhibitor switch 95. At step $S_2$ it is judged whether or not the vehicle velocity is zero, at step $S_3$ it is judged whether or not the idle switch 92 is ON (at the time of releasing the accelerator pedal) and at step $S_4$ it is judged whether or not the brake switch 9 is ON (at the time of stepping on the brake pedal 82). In the case where all of the above judgements are YES, namely, in the case where a vehicle stops with the brake working in the (D) range, at step $S_5$ while the control valve 7 is ON to control the forward clutch 15 to the release side and control the gear position to "neutral", the magnet valve 87 is controlled to an ON state, i.e., to the intercepting position 87a and to hold brake oil pressure acting on each wheel cylinder 80a, 81a of the wheels 80, 81. Then, at step $S_6$ it is confirmed that brake oil is in a held state by setting flag $F=1$.

On the other hand, in a case of the forward running range other the (D) range at steps $S_1$-$S_3$, in the case of running at vehicle velocity $\neq 0$, or in the case of the idle switch 92 being OFF (at the time of stepping on the accelerator pedal), at step $S_{12}$ flag F is reset to $F=0$ and control proceeds to step $S_7$. When the brake pedal is released at step $S_4$ control proceeds immediately to step $S_7$. At step $S_7$, as it is judged to be "running" or "at starting". the control valve 75 is controlled to OFF to control the forward clutch 15 to the clutching side and to make it possible to create the first gear-fourth gear (OD) stages. In the case where flag $F \neq 1$ at step $S_8$, at step $S_9$ the magnet valve 87 is controlled to OFF, i.e., to the pressure reducing position 87b so as to avoid trouble during running and releases the brake which acts on the wheel cylinders 80a, 81a of the wheels 80, 81.

In the case where $F=1$ at step $S_8$, it is the brake oil pressure holding state at a time when the vehicle is stopped and at step $S_{10}$ turbine r.p.m. is compared with a set value $N_0$. This set value $N_0$ is a value close to the turbine r.p.m. at the point of time when the first gear position (gear position at starting) is nearly formed by clutching action of the forward clutch 15. In the case where turbine r.p.m. $>N_0$, it is judged that formation of the first gear position is not yet finished and at step $S_{11}$ ON control of the magnet valve 87 is maintained and brake oil pressure acting on the wheels 80, 81 is maintained as it is.

At step $S_{10}$, if turbine r.p.m. $>N_0$ and the first gear position is almost formed, at step $S_9$ the magnet valve 87 is controlled to OFF and brake oil pressure acting on the wheels 80, 81 is released and then control proceeds to RETURN.

Figure 4:
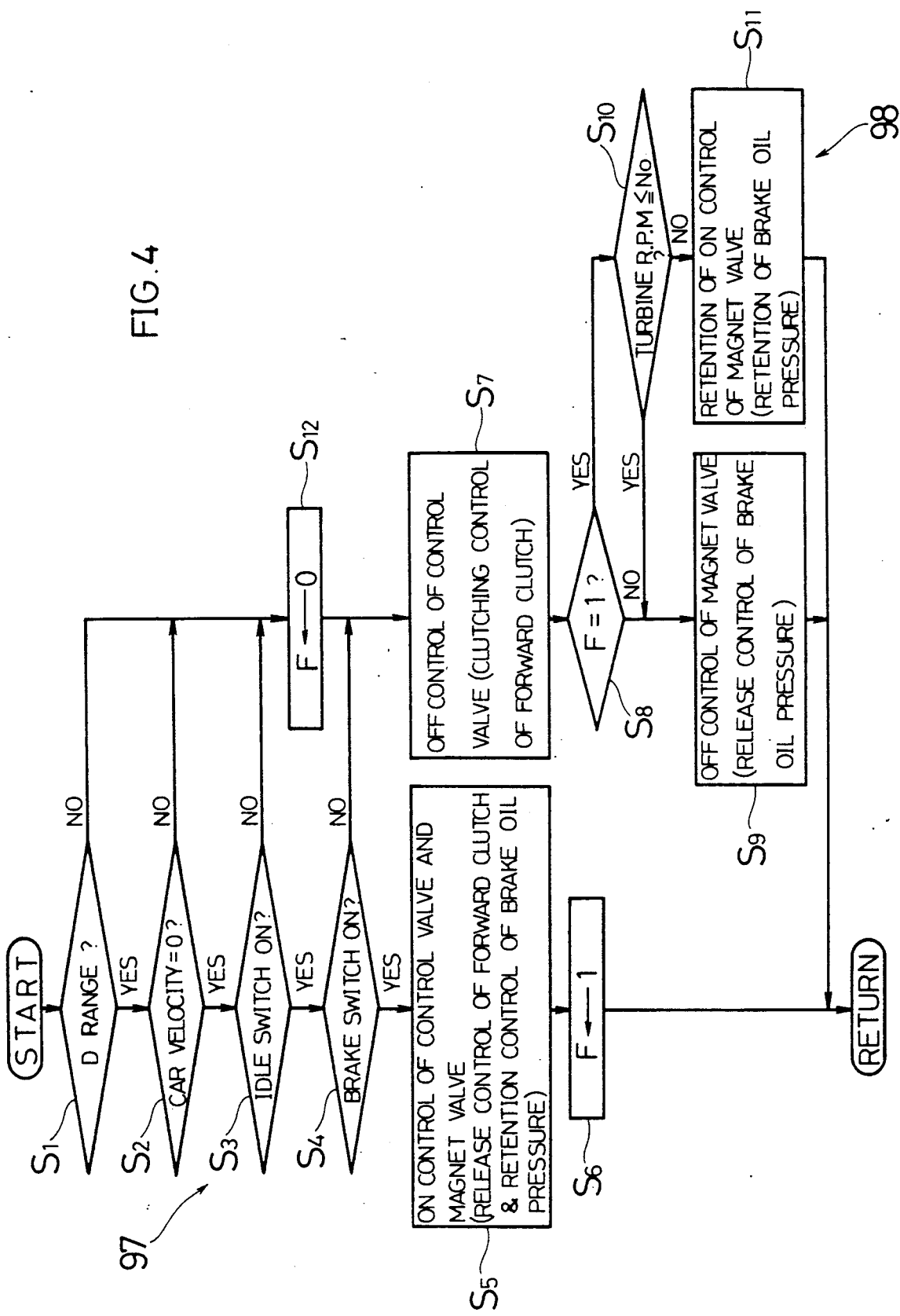
FIG. 4 is a flow chart of speed shifting control and brake control by a controller.

In the control flow chart of FIG. 4, by steps $S_1$-$S_5$ compose a speed shifting control means 97 which controls the automatic transmission Z to "neutral" while the brake pedal 82 is stepped on and the vehicle is stopped. Steps $S_4$, $S_6$-$S_{11}$, compose, a brake controlling means 98 whereby change of turbine r.p m. of the transmission due to receiving outputs of the brake switch 91 and the turbine r.p.m. sensor 94 and due to the first stage (as the starting gear position) being formed at the transmission Z by releasing operation of the brake pedal 82, maintains the magnet valve 87 in an ON condition until the turbine r.p.m. becomes smaller than the set value $N_0$ corresponding approximately to the time for complete clutching of the forward clutch 15 which composes the first gear. Thereby, of action of wheel cylinders 80a, 81a of each wheel, as brake actuators, is maintained to avoid slippage of the vehicle.

Figure 5:
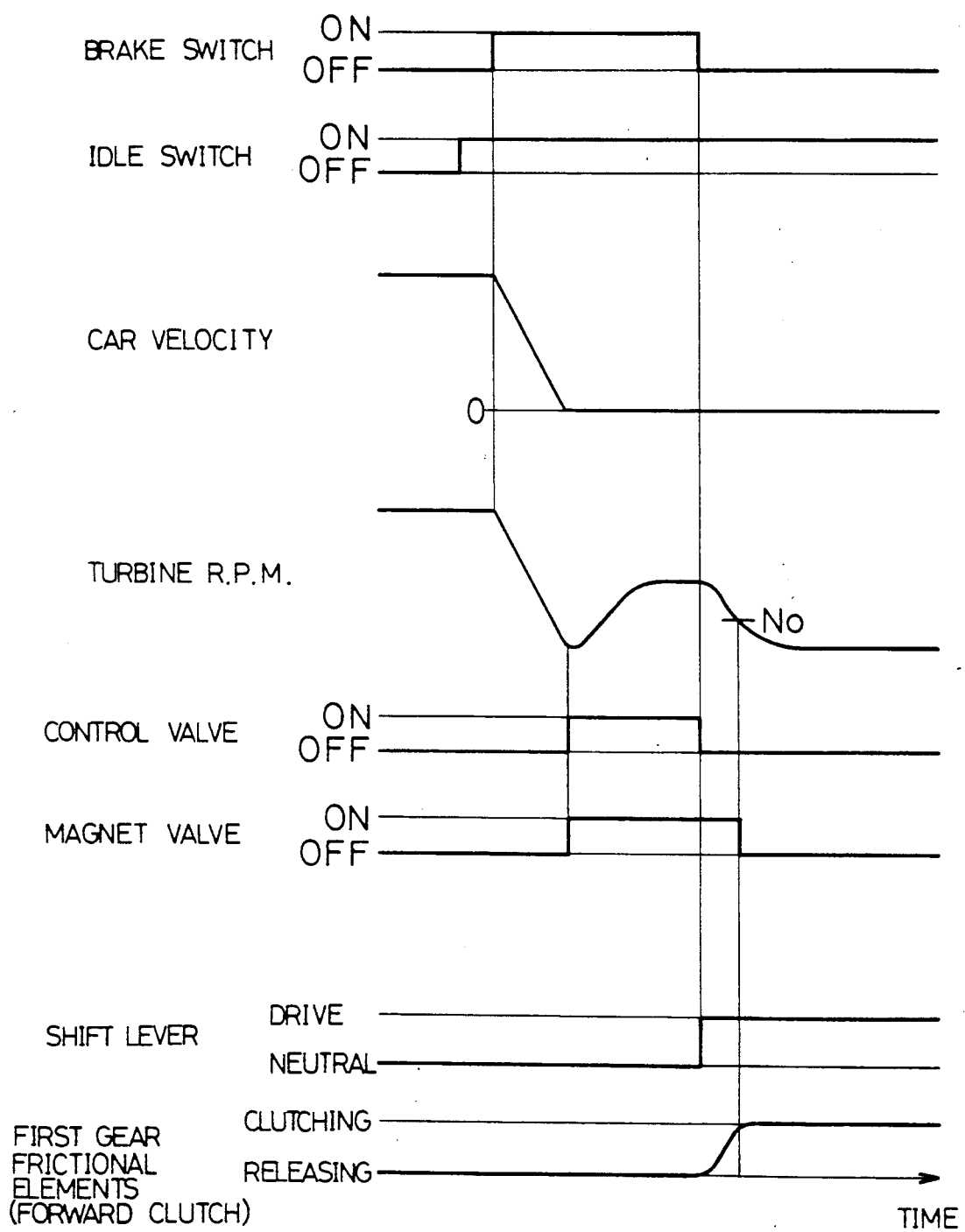
FIG. 5 is an explanatory drawing of the invention's operation.

The working of the above embodiment is explained below on the basis of FIG. 5.

When a driver releases the accelerator pedal and steps on the brake pedal so as to stop a vehicle, the idle switch 92 is turned ON and the brake switch 91 is also turned ON.

When the vehicle velocity decreases and reaches zero by the action of the brake, the control valve 75 is controlled to ON, whereby the forward clutch 15 is released, the gear position becomes "neutral", the magnet valve 87 is ON controlled and brake pressure of each wheel is maintained In this case, turbine r.p.m. of the transmission decreases with the reduction of vehicle velocity but when the gear position becomes "neutral", turbine r.p.m. rises again and settles down an r.p.m. corresponding to the idle r.p.m. of the engine.

Then, when the driver operates the shift lever of the automatic transmission to shift from the "neutral range" to the "drive range" and releases the brake pedal 82 (whereupon the brake switch 91 is turned OFF), the control valve 75 is controlled to OFF and accordingly the forward clutch 15 begins a clutching operation whereby the first gear stage begins to be formed. Then, with the start of formation of the first gear, turbine r.p.m. begins to decrease and becomes smaller than the set value $N_0$. When the first gear stage is almost formed, the magnet valve 87 is controlled to OFF and the action of the brake is released. Therefore, even at the time of stopping on an upwardly sloped road, the vehicle is prevented from slipping down and can start smoothly. Moreover, as the period of time during which action of the brake is maintained is the period of time until the first gear is almost formed. Namely, the minimum period of time before starting of a vehicle, more action of the brake than is necessary does not take place and the vehicle can be started smoothly.

In an above embodiment, the explanation is made regarding the case of the vehicle being stopped in the "D range" but it is a matter of course that the present invention is applicable to the other cases. For example, in the case where a vehicle stops at (1) range in the table, both of the forward clutch 15 and the coast clutch 17 are released to shift to "neutral". Similarly, in the case where a vehicle stops at (R) range, the reverse clutch 19 is released to shift "neutral".

I claim:

1. A neutral control device of an automatic transmission for a vehicle comprising:

speed shifting controlling means for controlling the transmission to be placed in "neutral" when a brake pedal is stepped on at a time when the vehicle is stopped;

pedal operation detecting means for detecting operation of the brake pedal;

clutched state detecting means for recieving output of the pedal operation detecting means and detecting a state that the starting gear position in the transmission is put in a clutched state by a brake pedal releasing operation; and brake controlling means for maintaining an ON state of a brake actuator until receiving output from the clutched state detecting means after the pedal operation detecting means has detected a pedal releasing operation.

2. A neutral control device of an automatic transmission as defined in claim 1, further comprising r.p.m. detecting means to detect r.p.m. on an input side of the transmission, wherein the clutched state detecting means detects a state wherein the starting gear position is put in a clutched state by detecting a condition when the r.p.m. on the input side of the transmission detected by the r.p.m. detecting means becomes smaller than a set value, said set value corresponding approximately to a time of connection of frictional elements composing the starting gear position.

3. A neutral control device of an automatic transmission as defined in claim 1, wherein the speed shifting controlling means detects the time of stopping on the basis of ON time of an idle switch which is placed in an ON state at a time of releasing an accelerator pedal while the automatic transmission is in D range and vehicle velocity is zero.

4. A neutral control device of an automatic transmission as defined in claim 2, wherein the r.p.m. detecting means detects a turbine r.p.m.

* * * * *